Figure 1:
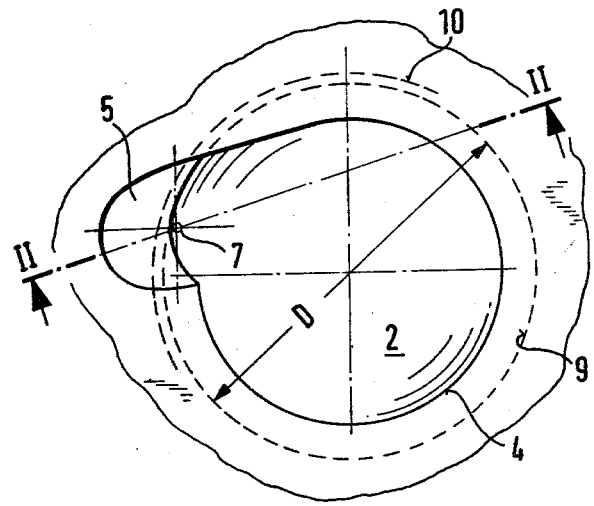

United States Patent [19]

Neitz et al.

[11] 4,286,556
[45] Sep. 1, 1981

[54] ARRANGEMENT FOR AIR-COMPRESSING DIRECT-INJECTION INTERNAL COMBUSTION ENGINES

[75] Inventors: Alfred Neitz, Röthenbach; Hans Pickel; Nunzio D'Alfonso, both of Nuremberg, all of Fed. Rep. of Germany

[73] Assignee: Maschinenfabrik Augsburg-Nürnberg Aktiengesellschaft, Nuremberg, Fed. Rep. of Germany

[21] Appl. No.: 79,155

[22] Filed: Sep. 26, 1979

[30] Foreign Application Priority Data

Sep. 29, 1978 [DE] Fed. Rep. of Germany ....... 2842457

[51] Int. Cl.³ .................................................. F02B 3/00
[52] U.S. Cl. ...................................... 123/279; 123/261
[58] Field of Search ............... 123/32 B, 30 C, 261, 123/279

[56] References Cited

U.S. PATENT DOCUMENTS

| | | | |
|---|---|---|---|
| 2,925,070 | 2/1960 | Meurer | 123/32 B |
| 2,975,773 | 3/1961 | Meurer | 123/32 B |
| 2,995,121 | 8/1961 | Meurer | 123/32 B |
| 3,056,392 | 10/1962 | Daub | 123/32 B |

Primary Examiner—Ronald B. Cox
Attorney, Agent, or Firm—Becker & Becker, Inc.

[57] ABSTRACT

An arrangement for air-compressing, direct-injection internal combustion engine having fuel ignition, at least one piston with a combustion chamber having a constricted throat and a pertaining cylinder having a pertaining cylinder head is disclosed. In this arrangement, the fuel injector and the combustion chamber of the piston are in communication with one another, the point of intersection of the longitudinal central axis of the fuel stream with the plane of the pertaining cylinder head which limits the upward movement of the piston is positioned within an imaginary circle having a diameter which is at most 1.1 times the greatest diameter of the combustion chamber, and the fuel injector is adapted to be located from the combustion chamber at a distance of up to about 30% of the greatest diameter of the combustion chamber.

2 Claims, 2 Drawing Figures

ARRANGEMENT FOR AIR-COMPRESSING DIRECT-INJECTION INTERNAL COMBUSTION ENGINES

The present invention relates to an arrangement for air-compressing direct-injection internal combustion engines with means for the ignition of fuel. More particularly, the invention relates to internal combustion engines in which at least one piston in a pertaining cylinder having a pertaining cylinder head includes a combustion chamber having the shape of a body of rotation, which combustion chamber has a constricted throat and which is adapted to accommodate movement of air therein about its longitudinal central axis. The fuel is injected into the combustion chamber with a channel, or recess, being provided for communicating the injector and the combustion chamber, whereby the fuel is deposited as a film onto the wall of the combustion chamber in the upper speed range and/or load range, while during idling and in the lower speed range and/or load range a substantially direct fuel-air intermixing occurs, with the injection pressure of the fuel at the nozzle orifice being maintained constant or at least nearly constant over the full operating range of the engine.

A similar combustion engine is known. However, this engine does not use a combustion chamber having a constricted throat but merely a chamber having the shape of a body of rotation. In the known combustion engine, the mixture-preparation and, accordingly, combustion during idling and in the lower speed range and load range is to be improved whereby under these conditions the injected fuel is to be mixed substantially directly with the combustion air because the required temperature for a sufficiently rapid combustion of the fuel, which is deposited as a film on the combustion chamber wall, is not attained which is indicated by the engine data and a poor exhaust gas quality.

In order to avoid the known drawbacks, a number of proposals has been advanced. However, such proposals entailed further other drawbacks. Thus, either the apparatus was too expensive or too complicated, or the drawbacks inherent in the technique of depositing the fuel on the combustion chamber wall during the upper operating range were only in part alleviated, etc.

The abovementioned combustion engine has brought about with simple, yet effective, means an appreciable improvement; however, it has been shown that the degree of atomization of the fuel in the lower operating ranges of the engine could not be considered to be optimally improved. In the upper operating ranges, however, most favorable results were experienced.

It has also been proposed, amongst others, to coordinate the velocity of the rotating combustion air and the exit velocity of the fuel jet to one another in such a way that at nominal speed of the engine these velocities would be at least nearly equal while at reduced velocity of the engine and with provision of a relative velocity, the velocity of the combustion air would be substantially reduced. Due to this effort in the upper operating ranges of the engine there occurs substantially no friction between the fuel jet and the combustion air, which friction would enhance the fuel atomization, thus the jet remains substantially a "closed" jet. In the lower operating range of the engine, in turn, a substantial friction is produced due to the relative velocity so that the fuel jet is effectively atomized. Furthermore, atomization can be improved when a nozzle with a throttle member and increased orifice is used because an increased contact area or surface area is provided between fuel and combustion air.

This proposal has been effective and an appreciable improvement of mixture formation and, accordingly, of the combustion has been achieved.

When using now, under consideration of the aforementioned proposals for optimizing such a combustion engine, a combustion chamber with the shape of a body of rotation, which combustion chamber includes a constricted throat, it is necessary, if only because of the required attitude of the fuel jet, but often more because of design considerations, to provide for the fuel injection a communicating channel, or recess, leading to the combustion chamber in the throat therein. However, it has then been noted that the engine data and/or the mixture-formation and combustion would again deteriorate over the entire operating range. The reason for this, in the lower speed range and load range, was that the orifice was just too far away from the actual combustion chamber. When the fuel was moving through the channel, or the recess, at times substantial amounts of the mixture cool appreciably, or even the mixture would separate again which would cause a partial deposition of the finely divided or atomized fuel on the wall of the communicating channel. This would cause poor exhaust gases which would be rich in uncombusted hydrocarbons and odor-carriers. Simply to enlarge the communicating channel or recess would not provide a solution because the volume of the actual combustion chamber would be decreased and the effect of the swirling of air or rotating air would be suppressed, whereby also the combustion would be unfavorably affected.

Also in the upper speed range and load range a relatively large distance between the nozzle for injecting the fuel and the actual combustion chamber causes problems. In this case, it is normally desired to deposit a substantial amount of the fuel as a film on the combustion chamber wall so that combustion is controlled with a minimum of soot being formed, while also avoiding too high pressure peaks, as is known. As has been mentioned above, the absence of a relative velocity between the combustion air and the fuel jet contributes substantially to this detriment. Such conditions cannot be produced in the communication channel or recess. At this point, it is not possible, at least at the end of the injection process, to attain a flow of the combustion air which would set the relative velocity in relation to the fuel jet equal to or at least nearly equal to zero, so that an undesirable excessive atomization or separation of the jet occurs which leads to an increase in soot in the exhaust gases.

This is the starting point of the invention which has as its object to provide a combustion engine arrangement which avoids the known detriments such as poor fuel combustion and soot formation.

Figure 2:
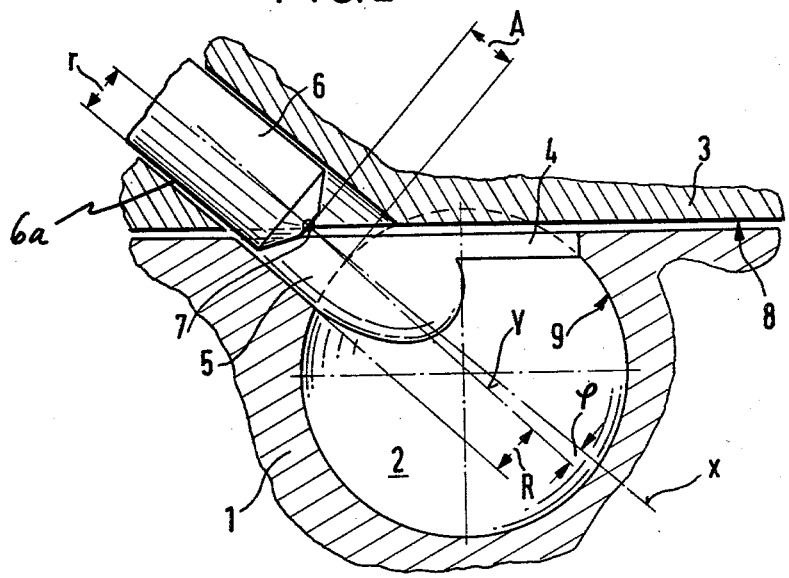

These objects and other objects and advantages of the invention will appear more clearly from the following specification in connection with the accompanying drawing, in which:

FIG. 1 is a top plan view indicating diagrammatically one embodiment of a spherical combustion chamber and a communicating channel in accordance with one embodiment of the invention; and FIG. 2 is a cross sectional view along line II—II in FIG. 1 indicating the combustion chamber and the arrangement of the fuel injector nozzle.

The arrangement in accordance with the invention is characterized primarily therein that, when viewing the combustion chamber in plan, the point of intersection of the central axis of the fuel jet with the plane of the cylinder is at least within an imaginary circle having a diameter which is at most 1.1 times the greatest diameter of the combustion chamber.

The arrangement in accordance with the invention is further characterized primarily therein that in the direction of the fuel jet, this fuel jet having a "geometric" configuration, the length of distance between the wall of the combustion chamber, which wall is interrupted by the communication channel or recess, and the tip of the fuel injection nozzle is less than, or at most equal to, 30% of the greatest combustion chamber diameter.

With such an arrangement, the length of the communicating channel, or recess, will be such that the separation phenomenon and, accordingly, deposit of the fuel on the wall of the communicating channel in the lower operating range is avoided while also avoiding an excessive atomization of the fuel jet in the upper operating range of the engine. Furthermore, the cross section of the communication channel need not be unduly widened.

When the communicating channel is in the form of a recess, in accordance with another preferred embodiment of the invention, it is proposed that the longitudinal axis of the depression forming the recess, this depression having a generally semicircular outline in the piston in the direction towards the bottom of the combustion chamber, extends steeper than the central axis of the fuel jet, that the central axis of the fuel jet and the longitudinal axis of the depression intersect at the outlet of the fuel injection nozzle perpendicular to the longitudinal central axis of said nozzle, and that the angle between the two is of from about 3° to about 15°. Irrespective of the diameter of the fuel injection nozzle, the radius of the semicircular depression is preferably of from about 4.75 to about 5.0 mm, irrespective whether the nozzle is a nozzle having a diameter of about 9 mm or about 14 mm. Thus, the benefits achieved by known techniques in beneficial mixture formation in combustion engines in all operating ranges of the engine are retained.

It should be mentioned here that the features of the invention can be attained by moving the injection nozzle in the cylinder head or by means of a combustion chamber arranged eccentrically to the longitudinal central axis of the piston.

Referring now particularly to the drawings, there is generally indicated a piston 1 in which is arranged a combustion chamber or depression generally designated by the numeral 2. The greatest diameter of the combustion chamber 2 is designated D. The combustion chamber 2 has a constricting throat 4 directed towards the pertaining cylinder head 3. In the throat 4 there is arranged a communicating channel, recess, or trough, generally designated by the numeral 5, in the form of a semicircular depression. A fuel injection nozzle 6 is arranged in the cylinder head 3 in a suitable opening 6a forming an extension of the communicating channel 5. The outlet or orifice of the fuel injection nozzle 6 is also referred to as the fuel-spray tip spray point. This point is designated by the numeral 7. The longitudinal central axis of the fuel injection nozzle is designated by x and indicates the direction of the "geometric" fuel jet.

The point of intersection of line x with the pertaining plane 8 of cylinder head 3, which cylinder head limits the movement of piston 1, is within the imaginary circle 10 which extends concentric to the circle defined by diameter D of the combustion chamber 2. This circle 10 is at most 1.1 times the diameter D of the combustion chamber 4. In the view of FIG. 2 this intersection point coincides with the point 7 when the piston 1 is in the pertaining upper top center position, indicated in FIG. 2. As is also indicated in FIG. 2, the distance A of the point 7 from the wall 9, which wall 9 delimits the combustion chamber 2 but which is interrupted by the channel 5, in the direction of line x, is less than or at most equal to 30% of diameter D.

Since the channel 5 is designed as a semicircular recess in this example, it is preferred to have the longitudinal axis y of this recess 5 extend in the direction of the combustion chamber 2 more steep than the line x. The two lines x and y intersect one another at point 7, with the angle $\phi$ being greater than about 3° and less than about 50°. The radius R of the recess 5 is between 4.75 mm and 5.0 mm, irrespective of the radius r of the injection nozzle 6.

The present invention is, of course, in no way restricted to the specific disclosure of the specification and drawings, but also encompasses any modifications within the scope of the appended claims.

What we claim is:

1. An arrangement for air-compressing, direct-injection internal combustion engine having means for the ignition of fuel for said engine, at least one piston and a pertaining cylinder having a pertaining cylinder head, said arrangement comprising:

a combustion chamber provided in said at least one piston, said combustion chamber having the shape of a body of rotation with a predetermined maximum diameter, having a constricted throat, and being adapted to accommodate movement of air therein about its longitudinal central axis;

injector means operatively connectible to said engine for injecting a fuel adapted to form a film on the wall of said combustion chamber in one of the upper speed and load ranges of said combustion engine while at engine idling and in one of the lower speed and load ranges an at least nearly complete direct fuel-air mixing occurs, whereby the fuel injection pressure is maintained at least nearly constant at the injector means fuel outlet over the full operating range of said engine; and means for communicating said injector means and said combustion chamber with one another, said means including a recess in said at least one piston, the point of intersection of the longitudinal central axis of a stream of fuel being emitted by said injector means with that plane of the pertaining cylinder head which limits the upward movement of said at least one piston being positioned within an imaginary circle the center of which is coincidental, when viewed in plan and when said at least one piston is in its upper to center position, with the center of said greatest diameter of said body of rotation on that plane which contains said greatest diameter and is parallel to said plane of the pertaining cylinder head which limits the upward movement of said at least one piston, said imaginary circle having at most a 10% greater diameter than said greatest diameter of said combustion chamber, with the injector means fuel outlet being adapted to be located at a distance from said combustion chamber in said communicating means, said distance corresponding to up to about 30% of the greatest diameter of said body of rotation, said recess being a semicircular recess arranged in said constricted throat of said combustion chamber, with the longitudinal central axis of said recess extending at an angle of from about 3° to about 15°, with the selected angle having its apex at said injector means fuel outlet, with one line defining said angle being said longitudinal central axis of a jet of fuel and the other line defining said angle being the longitudinal central axis of said recess and having a steeper inclination than that longitudinal central axis of a jet of fuel.

2. An arrangement according to claim 1, wherein the radius of curvature of said semicircular recess is from about 4.75 mm to about 5.0 mm, and is independent of the pertaining radius of said injector means.

* * * * *